(12) United States Patent
Kawakami et al.

(10) Patent No.: US 7,984,983 B2
(45) Date of Patent: Jul. 26, 2011

(54) INKJET RECORDING METHOD

(75) Inventors: Hiroshi Kawakami, Shizuoka-ken (JP); Masamichi Kobayashi, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 26 days.

(21) Appl. No.: 12/344,092

(22) Filed: Dec. 24, 2008

(65) Prior Publication Data

US 2009/0167832 A1    Jul. 2, 2009

(30) Foreign Application Priority Data

Dec. 28, 2007   (JP) ................................ 2007-340290

(51) Int. Cl.
   *G01D 11/00*   (2006.01)
(52) U.S. Cl. .................... 347/100; 106/31.13; 106/31.6; 523/160
(58) Field of Classification Search .................. 347/100, 347/104, 105, 106; 106/31.13, 31.6; 428/32.25; 523/160
   See application file for complete search history.

(56) References Cited

U.S. PATENT DOCUMENTS

| | | | | |
|---|---|---|---|---|
| 5,145,602 A | * | 9/1992 | Kissel | 516/31 |
| 6,737,128 B2 | * | 5/2004 | Kasahara | 428/32.31 |
| 6,838,135 B2 | * | 1/2005 | Kasahara | 428/32.31 |
| 6,852,379 B2 | * | 2/2005 | Kasahara | 428/32.5 |
| 6,908,648 B2 | * | 6/2005 | Kasahara | 428/32.25 |
| 2001/0023266 A1 | * | 9/2001 | Miyabayashi | 523/161 |
| 2009/0244121 A1 | * | 10/2009 | Kawakami | 347/7 |

FOREIGN PATENT DOCUMENTS

| | | |
|---|---|---|
| JP | 63-60784 A | 3/1988 |
| JP | 2001-096905 A | 4/2001 |
| JP | 2004-001412 A | 1/2004 |
| JP | 2004-35854 A | 2/2004 |
| JP | 2005-336496 A | 12/2005 |
| JP | 2006-110771 A | 4/2006 |
| JP | 2007177007 A * | 7/2007 |

OTHER PUBLICATIONS

Office Action issued for U.S. Appl. No. 12/391,643 dated Sep. 2, 2010.

* cited by examiner

*Primary Examiner* — Matthew Luu
*Assistant Examiner* — Rut Patel
(74) *Attorney, Agent, or Firm* — Sughrue Mion, PLLC

(57) ABSTRACT

The invention provides an inkjet recording method having applying, by an inkjet system, an ink containing 8 mass % or more of a water-soluble solvent having an SP value of 24 $(MPa)^{1/2}$ or less measured by a Hoy method onto an outermost surface layer, which contains an organic fine particle having an SP value of 25 $(MPa)^{1/2}$ or less measured by the Hoy method, of an inkjet recording medium having a support and one or more ink receiving layers including the outermost surface layer.

7 Claims, No Drawings

INKJET RECORDING METHOD

CROSS-REFERENCE TO RELATED APPLICATION

This application claims priority under 35 USC 119 from Japanese Patent Application No. 2007-340290 filed on Dec. 28, 2007, the disclosure of which is incorporated by reference herein.

BACKGROUND OF THE INVENTION

1. Technical Field

The present invention relates to an inkjet recording method.

2. Description of the Related Art

An inkjet recording method has become widely used from the viewpoint s that recording can be carried out on various recording materials, the hardware (device) is relatively inexpensive and compact and is superior in quietness. With recent development of high-resolution inkjet printers, hardware (device) and various inkjet recording media, so-called "photolike" high quality images have become possible.

A recording material for inkjet recording is generally required to have the characteristics of: (1) quick-drying (high absorption rate of ink), (2) suitable and uniform dot size (no spreading), (3) excellent granularity, (4) high dot roundness, (5) high color density, (6) high chroma (no dullness), (7) excellent water resistance, light fastness and ozone resistance of an image region, (8) high whiteness, (9) high storage stability (no yellowing or image blurring in long-term storage), (10) excellent dimensional stability with less deformation (less curling), and (11) excellent traveling in hardware.

In view of the foregoing, a recording material having an ink-receiving layer with a porous structure has been put to practical use in recent years. This recording material is considered to achieve excellent quick-drying property and high gloss. However, there is a tendency for very high quality to be demanded for a recorded image, and in particular, there are strict requirements for color density and color tone of an image. For example, deep colors in a high density range are important for contrast and sharp shading of an image, and no generation of bronzing is important for color tone and colorfulness.

In connection with the foregoing, techniques are known in which ink is applied, by an inkjet system, to an inkjet recording material having a thermoplastic resin particle-containing ink receiving layer provided on a support, and then the thermoplastic resin particles are dissolved or melted to form a film so that bronzing is suppressed (for example, Japanese Patent Application Laid-Open (JP-A) No. 2001-96905). Also, an inkjet recording material containing, in a surface layer, organic fine particles to be dissolved or swollen in a water-soluble organic solvent having an SP value of 18 to 31 has been known (for example, JP-A No. 2004-1412). Further, an inkjet recording material in which an ink-absorbing layer containing organic polymer fine particles to be dissolved or swollen in a solvent in ink is provided on a support has been known (for example, JP-A No. 63-60784).

SUMMARY

The inkjet recording method described in JP-A No. 2001-96905 can hardly be deemed to be a simple and easy method because heat treatment is necessary after application of ink in an inkjet system. Further, the suppression of bronzing can hardly be deemed to be satisfactory in the inkjet recording material described in JP-A No. 2004-1412.

The invention provides an inkjet recording method capable of suppressing bronzing without the need for heat treatment after application of ink by an inkjet system.

Namely, the present invention provides an inkjet recording method comprising applying, by an inkjet system, an ink comprising 8 mass % or more of a water-soluble solvent having an SP value of 24 $(MPa)^{1/2}$ or less measured by a Hoy method onto an outermost surface layer, which contains an organic fine particle having an SP value of 25 $(MPa)^{1/2}$ or less measured by the Hoy method, of an inkjet recording medium comprising a support and one or more ink receiving layers including the outermost surface layer.

DETAILED DESCRIPTION

The inkjet recording method of the invention includes applying, by an inkjet system, an ink containing 8 mass % or more of a water-soluble solvent having an SP value of 24 $(MPa)^{1/2}$ or less measured by a Hoy method onto an outermost surface layer, which contains an organic fine particle having an SP value of 25 $(MPa)^{1/2}$ or less measured by the Hoy method, of an inkjet recording medium comprising a support and one or more ink receiving layers including the outermost surface layer.

Ink

The inkjet recording method of the invention includes the use of an ink containing a water-soluble solvent having an SP value of 24 $(MPa)^{1/2}$ or less measured by a Hoy method, that is hereinafter sometimes referred to as a "specific solvent". The content of the specific solvent is 8 mass % or more with respect to the total mass of the ink.

When a water-soluble solvent having an SP value measured by a Hoy method of larger than 24 $(MPa)^{1/2}$ is used in the ink, a curling of an inkjet recording medium may tend to occur after the inkjet recording medium is provided with the ink. When a content of the specific solvent is less than 8 mass % with respect to the total mass of the ink, the effect of suppressing bronzing may not be sufficiently obtained. The inkjet recording method can be effectively suppressing bronzing without the need for heat treatment after application of ink by an inkjet system.

An SP value of the water-soluble solvent contained in the ink in the invention is 24 $(MPa)^{1/2}$ or less measured by the Hoy method. From the viewpoint of bronzing suppression and of the dispersion stability of a pigment in the ink, an SP value measured by the Hoy method is preferably 18 $(MPa)^{1/2}$ to 24 $(MPa)^{1/2}$, more preferably 20 $(MPa)^{1/2}$ to 22 $(MPa)^{1/2}$. When an SP value is 20 $(MPa)^{1/2}$ or more, the dispersion stability of a pigment in the ink can be improved.

The content of the water-soluble solvent is 8 mass % or more based on the ink, preferably 8 mass % to 50 mass %, more preferably 12 mass % to 30 mass %, from the viewpoint of bronzing suppression and of the dispersion stability of the pigment in the ink. Particularly when the content is 50 mass % or less, the dispersion stability of the pigment in the ink is improved.

From the viewpoint of bronzing suppression, the ink in the invention preferably contains 8 mass % or more of a water-soluble solvent having an SP value of 22 $(MPa)^{1/2}$ or less measured by the Hoy method, and more preferably 8 mass % to 30 mass % of a water-soluble solvent having an SP value of 20 $(MPa)^{1/2}$ to 22 $(MPa)^{1/2}$ measured by the Hoy method. From the viewpoint of the dispersion stability of the pigment in the ink, the ink also preferably contains 12 mass % or more of a water-soluble solvent having an SP value of 24 $(MPa)^{1/2}$ or less measured by the Hoy method, and more preferably 12 mass % to 50 mass % of a water-soluble solvent having an SP value of 20 $(MPa)^{1/2}$ to 24 $(MPa)^{1/2}$ measured by the Hoy method.

In the invention, the "SP value measured by the Hoy method" refers to a parameter of solubility of a compound calculated by the Hoy method based on the structure of the compound. The Hoy method is a calculation method described in, for example, K. L. Hoy "Table of Solubility Parameters", Solvent and Coatings Materials Research and Development Department, Union Carbides Corp. (1985).

The water-soluble solvent (the specific solvent) in the invention is not particularly limited as long as an SP value is 24 $(MPa)^{1/2}$ or less. In consideration of the structure of the water-soluble solvent, the solvent can be appropriately selected from polypropylene glycols, polyoxyethylene-polyoxypropylene glycols, polyoxyethylene-polyoxypropylene-alkyl ethers, polyoxyethylene-polyoxypropylene-glyceryl ethers, alkylene glycol monoalkyl ethers, and glycols.

Specific examples of the polypropylene glycols include NEWPOLE PP200 (SP value: 23.8, manufactured by Sanyo Chemical Industries, Ltd.) and NEWPOLE PP400 (SP value: 21.3, manufactured by Sanyo Chemical Industries, Ltd.).

Specific examples of the polyoxyethylene-polyoxypropylene glycols include NEWPOLE PE-61 (SP value: 20.0, manufactured by Sanyo Chemical Industries, Ltd.), NEWPOLE PE-62 (SP value: 20.1, manufactured by Sanyo Chemical Industries, Ltd.) and NEWPOLE PE-64 (SP value: 20.4, manufactured by Sanyo Chemical Industries, Ltd.).

Specific examples of the polyoxyethylene-polyoxypropylene-alkyl ethers include NEWPOLE 50HB55 (SP value: 21.1, manufactured by Sanyo Chemical Industries, Ltd.), NEWPOLE 50HB100 (SP value: 20.6, manufactured by Sanyo Chemical Industries, Ltd.), NEWPOLE 50HB260 (SP value: 20.6, manufactured by Sanyo Chemical Industries, Ltd.), NEWPOLE 50HB400 (SP value: 20.4, manufactured by Sanyo Chemical Industries, Ltd.) and NEWPOLE 50HB660 (SP value: 20.5, manufactured by Sanyo Chemical Industries, Ltd.).

Specific examples of the polyoxyethylene-polyoxypropylene-glyceryl ethers include NEWPOLE GEP-2800 (SP value: 20.7, manufactured by Sanyo Chemical Industries, Ltd.).

Specific examples of the alkylene glycol monoalkyl ethers include ethylene glycol monobutyl ether (SP value: 22.5), propylene glycol monobutyl ether (SP value: 21.5), diethylene glycol monobutyl ether (SP value: 22.3), triethylene glycol monobutyl ether (SP value 22.1) and triethylene glycol monomethyl ether (SP value: 23.4).

Specific examples of the glycols include 2-ethyl-1,3-hexanediol (SP value: 23.0) and 2-butyl-2-ethyl-1,3-butanediol (SP value: 23.1).

The molecular weight of the water-soluble solvent contained in the ink of the invention is preferably 150 to 5,000, more preferably 230 or more, and further preferably 230 to 3,500, from the viewpoint of improving ink discharge stability and from the viewpoint of improving the compatibility between the ink and organic fine particles in the ink receiving layer.

When the water-soluble solvent consists of a single compound, the molecular weight of the water-soluble solvent refers to a molecular weight calculated from its molecular formula. When the water-soluble solvent consists of a plurality of compounds, its molecular weight refers to a number-average molecular weight.

The ink used in the invention may contain one or more water-soluble solvents having an SP value of 24 $(MPa)^{1/2}$ or less.

The ink used in the invention may contain a water-soluble solvent having an SP value of more than 24 $(MPa)^{1/2}$ as long as the effect of the invention is not deteriorated. Specific examples of the water-soluble solvent having an SP value of more than 24 $(MPa)^{1/2}$ include 3-ethoxy-1,2-propanediol (SP value: 25.9), 1,6-hexanediol (SP value: 26.1), 3-methyl-1,3-butanediol (SP value: 25.3), 4-methyl-1,2-pentandiol (SP value: 24.3), 1,2-hexanediol (SP value: 24.9), diethylene glycol (DEG, SP value: 29.6), polyethylene glycols such as PEG200 (SP value: 24.6), and polyoxypropylene-glyceryl ethers such as NEWPOLE GP-250 (SP value: 24.6, manufactured by Sanyo Chemical Industries, Ltd.).

In the invention, the content of the water-soluble solvent having an SP value of more than 24 $(MPa)^{1/2}$ is typically 0 mass % to 40 mass %, preferably 5 mass % to 30 mass %, and more preferably 5 mass % to 20 mass %, with respect to the total mass of the ink.

The ink used in the invention preferably further contains at least one coloring material in addition to the water-soluble solvent. Examples of the coloring material that can be used in the invention include a dye and a pigment.

As the dye, a general dye that can be used for inkjet may be used. Examples of dyes that can be used include coloring agents classified in the Color Index as oil-soluble dyes or basic dyes as well as dyes classified as acid dyes, direct dyes, reactive dyes, vat dyes, sulfide dyes or food dyes.

Examples of the pigment for forming a black ink include carbon black (C. I. Pigment Black 7) such as Farness Black, Lamp Black, Acetylene Black or Channel Black, metals such as copper oxides, iron oxides (C. I. Pigment Black 11) or titanium oxides, and organic pigments such as Aniline Black (C. I. Pigment Black 1). Carbon black is preferable for inkjet since it has is relatively low density and is hardly precipitated.

Examples of the pigment for a color ink that can be used include: C. I. Pigment Yellow 1 (Fast Yellow G), 3, 12 (Disaza Yellow AAA), 13, 14, 17, 24, 34, 35, 37, 42 (yellow iron oxide), 53, 55, 74, 81, 83 (Disaza Yellow HR), 93, 94, 95, 97, 98, 100, 101, 104, 108, 109, 110, 117, 120, 128, 138, 153, or 180; C. I. Pigment Red 1, 2, 3, 5, 17, 22 (Brilliant Fast Scarlet), 23, 31, 38, 48:2 (Permanent Red 2B (Ba)), 48:2 (Permanent Red 2B (Ca)), 48:3 (Permanent Red 2B (Sr)), 48:4 (Permanent Red 2B (Mn), 49:1, 52:2, 53:1, 57:1 (Brilliant Carmine 6B), 60:1, 63:1, 63:2, 64:1, 81 (Rhodamine 6G Lake), 83, 88, 101 (colcothar), 104, 105, 106, 108 (Cadmium Red), 112, 114, 122 (Quinacridone Magenta), 123, 146, 149, 166, 168, 170, 172, 177, 178, 179, 185, 190, 193, 202, 206, 209, or 219; C. I. Pigment Violet 19 or 23; C. I. Pigment Orange 36; C. I. Pigment Blue-1, 2, 15 (Phthalocyanine Blue R), 15:1, 15:2, 15:3 (Phthalocyanine Blue G), 15:4, 15:6 (Phthalocyanine Blue E), 16, 17:1, 56, 60, or 63; and C. I. Pigment Green 1, 4, 7, 8, 10, 17, 18 and 36.

From the viewpoint of improvement of light fastness and prevention of color drift phenomenon, the ink used in the invention preferably contains at least one pigment as a coloring agent.

When the coloring agent is a pigment, the pigment can be dispersed in the ink with a dispersing machine. Any of commercially available dispersing machines may be used as the dispersing machine, and a non-media dispersing machine is preferable. Examples of such dispersing machine include a wet jet mill (trade name, manufacture by Genus Co., Ltd.), NANOMISER (trade name, manufactured by Nanomaser Co., Ltd.), HOMOGENIZER (trade name, manufactured by Gaulin Inc.), Altimizer (manufactured by Sugino Machine Co., Ltd.) and MICROFLUIDIZER (trade name, manufactured by Microfluidex International Corporation).

In the invention, the content of the coloring material in the ink is preferably 0.5 mass % to 30 mass %, and is more preferably 1.0 mass % to 15 mass % with respect to the total mass of the ink. When the content is 0.5 mass % or more, the printing density of an image formed of the ink can be made excellent. When the content is 30 mass % or less, an increase of the viscosity of the ink and the generation of the structural viscosity as the viscosity characteristics of the ink can be prevented, and the discharge stability of the ink through an inkjet nozzle can be improved.

For the purpose of securing its stability when it is left, improving discharge stability through an inkjet head, and preventing clogging or preventing deterioration, the ink used in the invention may contain various additives such as humectants, solubilizers, permeability regulators, viscosity modifiers, pH adjusters, solubilizers, antioxidants, preservatives, fungicides, corrosion suppressors, or chelators for scavenging metal ions influencing dispersion.

Inkjet Recording Medium

The inkjet recording method of the invention uses an inkjet recording medium comprising a support and one or more ink receiving layers including an outermost surface layer, which is the farthest from the support among the ink receiving layers and contains an organic fine particle having an SP value of 25 $(MPa)^{1/2}$ or less measured by the Hoy method (hereinafter sometimes referred to as a "specific organic fine particle").

When the structure of a molecule forming the organic fine particle is evident, an SP value calculated based on the structure by the Hoy method is used as an SP value of the organic fine particles. When it is difficult to calculate an SP value from the structure of a molecule forming the organic fine particle, an SP value of the organic fine particle is specified in the following manner.

Namely, solvents, the SP value of which can be calculated by the Hoy method and which have various SP values, are firstly prepared as standard solvents. Then, the organic fine particle is mixed with each of the standard solvents, and an SP value of one of the standard solvents with which the organic fine particle gives the optimum solubility when being mixed is defined as an SP value of the organic fine particle. Examples of the standard solvents include the following solvents.

SP Values of Standard Solvents

Diisobutyl ketone (SP value: 17.9): An SP value of the organic fine particle is about 18.

Cyclohexanone (SP value: 20.1): An SP value of the organic fine particle is about 20.

Newpole PP-300 (trade name, manufactured by Sanyo Chemical Industries, Ltd.; SP value: 22.1): An SP value of the organic fine particle is about 22.

Acetonitrile (SP value: 24.0): An SP value of the organic fine particle is about 24.

Ethanol (SP value: 26.2): An SP value of the organic fine particle is about 26.

In the invention, an SP value of the organic fine particle contained in the ink-receiving layer as the outermost layer is 25 $(MPa)^{1/2}$ or less. From the viewpoint of suppressing bronzing, an SP value is preferably 17 $(MPa)^{1/2}$ to 23 $(MPa)^{1/2}$, more preferably 19 $(MPa)^{1/2}$ to 22 $(MPa)^{1/2}$.

While the specific organic fine particle that can be used in the invention is not particularly restricted as long as an SP value is 25 $(MPa)^{1/2}$ or less, it is preferably a polymer fine particle in a dispersed state in a medium. In consideration of an SP value, the specific organic fine particle can be appropriately selected from, for example, multicomponent copolymers such as vinyl acetate-acrylic emulsion, acryl-urethane emulsion, vinyl acetate-ethylene emulsion, styrene-acrylic emulsion, acrylic emulsion, vinyl acetate emulsion, chlorinated polyolefin emulsion, or ethylene-vinyl acetate-acrylic emulsion, SBR latex, NBR latex, MBR latex, carboxylated SBR latex, carboxylated NBR latex, carboxylated MBR latex, water-soluble urethane resin, and water-soluble polyester resin.

In the invention, either a single kind of an organic fine particle or a mixture of two or more different kinds of organic fine particles which are different in monomer composition, particle size and/or polymerization degree may be used.

Examples of the specific organic fine particle that can be used in the invention include vinyl acetate-acrylic emulsion such as MOWINYL 630 (trade name, manufactured by Nichigo-Mowinyl Co., Ltd., SP value: about 20), acryl-urethane emulsion such as BONCOAT CG-5030 (trade name, manufactured by Dainippon Ink And Chemicals, Incorporated, SP value: about 22), vinyl acetate-ethylene emulsion such as MOWINYL 180E (trade name, manufactured by Nichigo-Mowinyl Co., Ltd., SP value: about 18), styrene-acrylic emulsion such as MOWINYL 880 (trade name, manufactured by Nichigo-Mowinyl Co., Ltd., SP value: about 20), and styrene-acrylic resin fine particles such as BONCOAT 5391 (trade name, manufactured by Dainippon Ink And Chemicals, Incorporated, SP value: about 20).

The particle size of the specific organic fine particle in the invention is not particularly limited, and usually those having a diameter of 0.01 μm to 20 μm are used. By using the organic fine particle in this range, ink absorption and white glossiness of the inkjet recording medium can be made excellent.

The amount of the specific organic fine particle applied to a unit area (namely, a square meter) of the outermost surface layer of the ink receiving layer of the inkjet recording medium used in the invention is preferably 0.2 g to 5.0 g, and is more preferably 0.3 g to 3.0 g or less, from the viewpoint of suppressing bronzing. In the invention, the amount of the specific organic fine particle contained in a volume corresponding to a square meters of the outermost surface layer preferably contains 0.2 g to 3.0 g of an organic fine particle having an SP value of 17 $(MPa)^{1/2}$ to 23 $(MPa)^{1/2}$, and more preferably contains 0.3 g to 2.0 g of an organic fine particle having an SP value of 19 $(MPa)^{1/2}$ to 22 $(MPa)^{1/2}$.

The outermost surface layer of the ink receiving layer in the invention may further contain other fine particle(s), water-soluble resin and/or the like described later, in addition to the organic fine particle if necessary.

The amount of dry solid content in the outermost surface layer of the ink receiving layer is preferably 0.2 $g/m^2$ to 8.0 $g/m^2$, and is more preferably 0.3 $g/m^2$ to 5.0 $g/m^2$, from the viewpoint of the ink receiving property and of suppressing bronzing.

From the viewpoint of the ability to absorb ink, the inkjet recording medium in the invention preferably has, in addition to the outermost surface layer of the ink receiving layer containing the fine organic particles having an SP value of 25 $(MPa)^{1/2}$ or less (hereinafter referred to sometimes as "first ink receiving layer"), at least one ink receiving layer containing a fine particle and a water-soluble resin (hereinafter referred to sometimes as "second ink receiving layer") between the outermost surface layer of the ink receiving layer and the support.

The first ink receiving layer in the invention can be formed by, for example, applying a first ink receiving layer coating liquid containing an emulsion of organic fine particles having an SP value of 25 $(MPa)^{1/2}$ or less so as to be laminated on a support or on the second ink receiving layer previously formed on a support, followed by drying.

The first ink receiving layer may be formed either by providing thereof on at least one second ink receiving layer previously formed on a support or by providing thereof simultaneously with the second ink receiving layer.

The application of the first ink receiving layer may be performed by a known coating method using, for example, a curtain flow coater, an extrusion die coater, air doctor coater, blade coater, rod coater, knife coater, squeeze coater, reverse roll coater or bar coater.

The coated liquid is dried to form a layer. This drying is carried out generally at 40° C. to 180° C. for 0.5 minute to 10 minutes, and preferably at 40° C. to 100° C. for 0.5 minute to 5 minutes.

When the first ink receiving layer coating liquid is applied onto the second ink receiving layer previously formed on a support, the application of the first ink receiving layer is preferably performed by a method in which a coater is not brought into direct contact with the second coating layer which has been already formed, and examples thereof include those using an extrusion die coater, a curtain flow coater or a bar coater.

When the first ink receiving layer is simultaneously formed with the second ink receiving layer, the first ink receiving layer coating liquid is simultaneously applied with the second ink receiving layer coating liquid (multilayer coating). The simultaneous coating (multilayer coating) can be performed by a known coating method using an extrusion die coater, a curtain flow coater or the like.

The applied coating liquids are dried after the simultaneous coating to form layers. This drying is carried out generally at 40° C. to 180° C. for 0.5 minute to 10 minutes, and preferably at 40° C. to 100° C. for 0.5 minute to 5 minutes.

The second ink receiving layer in the invention may be essentially formed of a water-soluble resin and fine particles. The second ink receiving layer in the invention may be preferably formed of a water-soluble resin, fine particles, and a crosslinking agent capable of crosslinking the water-soluble resin, and may further contain a mordant and other components such as a surfactant if necessary.

The second ink receiving layer with a porous structure is formed by containing fine particles, thereby improving the ability to absorb ink. When the solid content of fine particles in the second ink receiving layer is 50 mass % or more, the layer can be formed to have a more excellent porous structure, which may further improve the ability to absorb ink. This improvement is made to be more remarkable when the solid content thereof is 60 mass % or more. The solid content of fine particles in the ink receiving layer is a content calculated based on non-water components in a composition constituting the second ink receiving layer.

The ink receiving layer with a porous structure refers to a layer having a porosity of 50% to 75%, preferably 60% to 70%. When the porosity is less than 50%, ink absorption may be insufficient. When the porosity is more than 75%, there may arise a powder dropping due to binder shortage. In view of obtaining favorable quality of the inkjet recording medium, the thickness of the second ink receiving layer is preferably 20 μm to 40 μm.

Fine Particles

The fine particles may be an organic fine particle or an inorganic fine particle. Preferable examples of the organic fine particle include polymer fine particles obtained by emulsion polymerization, micro-emulsion polymerization, soap-free polymerization, seed polymerization, dispersion polymerization or suspension polymerization. Specific examples of the fine particles include powder, latex or emulsion of polymer fine particles of polyethylene, polypropylene, polystyrene, polyacrylate, polyamide, silicone resin, phenol resin or natural polymer.

Examples of the inorganic fine particles include silica fine particles, colloidal silica, titanium dioxide, barium sulfate, calcium silicate, zeolite, kaolinite, halloysite, mica, talc, calcium carbonate, magnesium carbonate, calcium sulfate, pseudoboehmite, zinc oxide, zinc hydroxide, alumina, aluminum silicate, calcium silicate, magnesium silicate, zirconium oxide, zirconium hydroxide, cerium oxide, lanthanum oxide and yttrium oxide.

Among these, inorganic fine particles are preferable from the viewpoint of ink absorbance and image stability, and silica fine particles, colloidal silica, alumina fine particles and pseudo boehmite are preferable from the viewpoint of forming an excellent porous structure. The fine particles may be used as they are primary particles or may be used in the state of forming secondary particles. The average primary particle of the fine particles is preferably 2 μm or less, and more preferably 200 nm or less.

Silica fine particles are generally roughly divided into wet method particles and dry method particles (vapor phase method particles) in terms of a production method. The mainstream of the wet method is the one including decomposing a silicate by an acid to generate active silica, appropriately polymerizing the active silica, and coagulating-and-settling the resultant to obtain hydrate silica. On the other hand, the mainstream of the vapor phase method is a flame hydrolysis method, which includes hydrolyzing silicon halide at high temperature under high pressure, and an arc method, which includes heating quartz sand and cokes and reducing by arc in an electric furnace to vaporize and oxidizing the vaporized product by air to obtain anhydrous silica. The "vapor phase silica" means anhydrous silica fine particles obtained by the vapor phase method. The vapor phase method silica fine particles are particularly preferable as the silica fine particles used in the invention.

While the vapor phase method silica is different from the hydrate silica in, for example, the density of a silanol group on the surface and the presence/absence of voids, and exhibits natures different from those of hydrate silica, the vapor phase silica is preferable to form a three-dimensional structure having a high porosity. Although the reason therefor is not clarified it is estimated as follows. Namely, it is inferred that the density of a silanol group on the surface of the fine particles of hydrate silica is as many as 5 groups/nm$^2$ to 8 groups/nm$^2$, and therefore the silica fine particles are easily aggregated densely, whereas the density of a silanol group on the surface of fine particles of the vapor phase method silica is 2 groups/nm$^2$ to 3 groups/nm$^2$, and therefore, silica fine particles become a rough soft flocculate, with the result that the vapor phase method silica forms a structure having a high porosity.

The vapor phase method silica may provide the characteristics of improved ink absorbance and ink retaining efficiency to the inkjet recording medium because it has a particularly large specific surface area. Further, since the vapor phase method silica has a low refractive index, transparency can be imparted to the ink receiving layer when it is dispersed until it has a proper particle diameter. Thus, the vapor phase method silica may provide a high color density and sufficient color developing ability to the inkjet recording medium. The transparency of the ink receiving layer is important from the viewpoint of obtaining a highly developed color density and sufficiently developed color gloss not only in applications which need transparency, such as OHPs, but also in applications of recording media such as photo-gloss paper.

The average primary particle diameter of the vapor phase method silica is 30 nm or less, preferably 20 nm or less, particularly preferably 10 nm or less and most preferably 3 to 10 nm. Since the vapor phase method silica particles are easily stuck to each other by a hydrogen bond due to a silanol group, the vapor phase method silica can form a structure having a large porosity when the average primary particle diameter is 30 nm or less, whereby the ink absorbance of the recording medium of the invention can be efficiently improved.

The silica fine particles may be used in combination with any one or more of the fine particles other than silica fine particles. When the other fine particles are combined with the vapor phase method silica, the content of the vapor phase method silica with respect to all fine particles in the second ink receiving layer is preferably 30 mass % or more, and more preferably 50 mass % or more.

Preferable examples of the other inorganic fine particles include alumina fine particles, alumina hydrate, and a mixture or a complex of these. Among these, an alumina hydrate is preferable because it well absorbs and fixes ink, and pseudo-boehmite ($Al_2O_3 \cdot nH_2O$) is particularly preferable. While any one of various states of the alumina hydrate may be used, sol-like boehmite is preferably used as a raw material because a smooth layer is obtained with ease.

The average radius of pores in the porous structure of pseudo-boehmite is preferably 1 nm to 25 nm, and more preferably 2 nm to 10 nm. The volume of the pores is preferably 0.3 ml/g to 2.0 ml/g, and more preferably 0.5 ml/g to 1.5 ml/g. Here, the pore radius and the pore volume are measured by a nitrogen adsorbing/desorbing method and specifically measured using a gas desorbing analyzer (for example, trade name: "OMNISOAP 369", manufactured by Coulter Company).

Among the alumina fine particles, vapor phase method alumina fine particles have a large specific surface area and are hence preferable. The average primary particle diameter of the vapor phase method alumina is preferably 50 nm or less, and more preferably 20 nm or less.

Colloidal silica having an average primary particle diameter of 50 nm or less is also given as preferable examples of the other inorganic particles.

The fine particles may also be used in any one of forms disclosed in, for example, each publication of JP-A Nos. 10-81064, 10-119423, 10-157277, 10-217601, 11-348409, 2001-138621, 2000-43401, 2000-211235, 2000-309157, 2001-96897, 2001-138627, 11-91242, 8-2087, 8-2090, 8-2091, 8-2093, 8-174992, 11-192777 and 2001-301314.

Water-Soluble Resin

The second ink-receiving layer preferably contains a water-soluble resin. Examples of the water-soluble resin include polyvinyl alcohol resins which are resins having a hydroxy group as a hydrophilic structural unit (for example, polyvinyl alcohol (PVA), acetoacetyl-modified polyvinyl alcohol, cation-modified polyvinyl alcohol, anion-modified polyvinyl alcohol, silanol-modified polyvinyl alcohol and polyvinylacetal), cellulose resins (for example, methyl cellulose (MC), ethyl cellulose (EC), hydroxyethyl cellulose (HEC), carboxymethyl cellulose (CMC), hydroxypropyl cellulose (HPC), hydroxyethylmethyl cellulose and hydroxypropylmethyl cellulose), chitins, chitosans, starch, resins having an ether bond (for example, polyethylene oxide (PEO), polypropylene oxide (PPO), polyethylene glycol (PEG) and polyvinyl ether (PVE)) and resins having a carbamoyl group (for example, polyacrylamide (PAAM), polyvinylpyrrolidone (PVP) and hydrazide polyacrylate). Among these compounds, polyvinyl alcohol resins, cellulose resins, resins having an ether bond, resins having a carbamoyl group, resins having a carboxy group and gelatins are preferable.

Examples thereof further include polyacrylates, maleic acid resins, alginate and gelatins, which all have a carboxyl group as a dissociable group.

Among the above compounds, particularly polyvinyl alcohol resins are preferable. Examples of the polyvinyl alcohol include those described in, for example, Japanese Patent Publication (JP-B) Nos. 4-52786, 5-67432 and 7-29479, JP No. 2537827, JP-B No. 7-57553, JP Nos. 2502998 and 3053231, JP-A No. 63-176173, JP No. 2604367, JP-A Nos. 7-276787, 9-207425, 11-58941, 2000-135858, 2001-205924, 2001-287444, 62-278080, 9-39373, JP No. 2750433, JP-A Nos. 2000-158801, 2001-213045, 2001-328345, 8-324105 and 11-348417.

These water-soluble resins may be used either singly or in combinations of two or more. The content of the water-soluble resin is preferably 9% to 40 mass % and more preferably 12% to 33 mass % based on the total solid content in the ink-receiving layer.

The water-soluble resin and the fine particles, which mainly form the ink-receiving layer of the inkjet recording medium, may be respectively a single material or may be a mixture of plural materials.

The kind of the water-soluble resin to be combined with the fine particles (particularly the silica fine particles) is important from the viewpoint of retaining transparency of the inkjet recording medium. When the vapor phase method silica is used, polyvinyl alcohol resins are preferable as the water-soluble resin. Among these resins, polyvinyl alcohol resins having a saponification degree of 70% to 100% are more preferable, and polyvinyl alcohol resins having a saponification degree of 80% to 99.5% are particularly preferable.

The polyvinyl alcohol resin has a hydroxyl group in its structural units. Because the hydroxyl group and a surface silanol group of the silica fine particles form a hydrogen bond, a three-dimensional network structure in which secondary particles of the silica fine particles form network chain units can be easily formed. It is assumed that the formation of the three-dimensional structure ensures the formation of the ink-receiving layer having a porous structure having a high porosity and sufficient strength.

In inkjet recording, the porous ink-receiving layer obtained in the above manner may rapidly absorb ink by a capillary phenomenon to form favorable dots that have a true-circularity and are free from ink bleeding.

Also, the polyvinyl alcohol resin may be used in combination with any one of the water-soluble resins other than the polyvinyl alcohol resin. When the other resin and the polyvinyl alcohol resin are used together, the content of the polyvinyl alcohol resin with respect to the total amount of all water-soluble resins is preferably 50 mass % or more, and more preferably 70 mass % or more.

Ratio of Fine Particles to Water-Soluble Resin

The weight ratio by mass [PB ratio=x/y] of the amount "x" of the fine particles to the amount "y" of the water-soluble resin in the ink-receiving layer largely affects the layer structure and the layer strength of the ink-receiving layer. Specifically, when the weight ratio (PB ratio) is increased, the density and the strength tend to decrease though the porosity, pore volume, and surface area (per unit mass) tend to increase.

The PB ratio (x/y) in the ink-receiving layer is preferably 1.5 to 10 from the viewpoint of preventing defects caused by excessive large PB ratio such as a reduction in layer strength or a formation of cracks during drying as well as preventing defects caused by excessive small PB ratio such as a reduction in ink absorbance which is caused by reduced porosity due to occurrence of tendency of clogging of the voids by the resin.

Since there may be a case where pressure is applied to the inkjet recording medium when it is passed through a carrying system, the ink-receiving layer is desired to have sufficient layer strength. The ink-receiving layer is also desired to have sufficient layer strength from the viewpoint of preventing the ink-receiving layer from being cracked and peeled off in the case of cutting the medium into sheets. Taking these facts into account, the PB ratio is preferably 5 or less, and is more preferably 2 or more, from the viewpoint of ensuring high speed ink absorbance.

For example, when a coating liquid obtained by dispersing the vapor phase method silica fine particles having an average primary particle diameter of 20 nm or less and the water-soluble resin in a P/B ratio (x/y) of 2 to 5 completely in an aqueous solution is applied to the support and dried, a three-dimensional network structure in which secondary particles of the silica fine particles form network chain units is formed, making it possible to form a translucent porous film having an average pore diameter of 25 nm or less, a porosity of 50% to 80%, a pore specific volume of 0.5 ml/g or more and a specific surface area of 100 $m^2/g$ or more with ease.

Crosslinking Agent

The second ink-receiving layer is preferably a porous layer formed by curing, by a crosslinking reaction between a crosslinking agent and the water-soluble resin, a coating layer which further contains a crosslinking agent capable of crosslinking the water-soluble resin in addition to the fine particles and the water-soluble resins.

A boron compound is preferable to crosslink the water-soluble resin, particularly to crosslink a polyvinyl alcohol resin. Examples of the boron compound include borax, boric acid, borates (for example, orthoborates, $InBO_3$, $ScBO_3$, $YBO_3$, $LaBO_3$, $Mg_3(BO_3)_2$, $Co_3(BO_3)_2$, diborates (for example, $Mg_2B_2O_5$ and $Co_2B_2O_5$), methaborates (for example, $LiBO_2$, $Ca(BO_2)_2$, $NaBO_2$ and $KBO_2$), tetraborates (for example, $Na_2B_4O_7 \cdot 10H_2O$) and pentaborates (for example, $KB_5O_8 \cdot 4H_2O$ and $CsB_5O_5$)) and $Ca_2B_6O_{11} \cdot 7H_2O$. Among These compounds, borax, boric acid, and borates are preferable and boric acid is particularly preferable in the point that these compounds can cause a crosslinking reaction rapidly.

Besides the boron compounds, the following compounds may be used as the above crosslinking agent for the water-soluble resin.

Examples of the crosslinking agent include aldehyde compounds such as formaldehyde, glyoxal and glutaraldehyde; ketone compounds such as diacetyl and cyclopentanedione; active halogen compounds such as bis(2-chloroethylurea)-2-hydroxy-4,6-dichloro-1,3,5-triazine and 2,4-dichloro-6-S-triazine sodium salt; active vinyl compounds such as divinylsulfonic acid, 1,3-vinylsulfonyl-2-propanol, N,N'-ethylenebis(vinylsulfonylacetamide), 1,3,5-triacryloyl-hexahydro-S-triazine; N-methylol compounds such as dimethylolurea and methylol dimethylhydantoin, melamine resins (for example, methylolmelamine and alkylated methylol melamine); epoxy resins; isocyanate compounds such as 1,6-hexamethylenediisocyanate; aziridine compounds described in the specification of U.S. Pat. Nos. 3,017,280 and 2,983,611; carboxyimide compounds described in the specification of U.S. Pat. No. 3,100,704; epoxy compounds such as glycerol triglycidyl ether; ethyleneimino compounds such as 1,6-hexamethylene-N,N'-bisethyleneurea; halogenated carboxyaldehyde compounds such as mucochloric acid and mucophenoxychloric acid; dioxane compounds such as 2,3-dihydroxydioxane; metal-containing compounds such as titanium lactate, aluminum sulfate, chrome alum, potassium alum, zirconium acetate and chromium acetate; polyamine compounds such as tetraethylenepentamine; and hydrazide compounds such as dihydrazide adipate; and low-molecular materials or polymers having two or more oxazoline groups.

The crosslinking agents may be used either singly or in combinations of two or more.

The crosslinking and curing are preferably carried out in the following manner: a crosslinking agent is added to a coating liquid (hereinafter also referred to as "ink-receiving layer coating liquid" or "first liquid") that contains the fine particles and the water-soluble resin and is used to form the ink-receiving layer and/or the following basic liquid, and the basic liquid (hereinafter referred to also as "second liquid") having a pH of 7.1 or more is applied to the above coating layer (1) at the same time when the above first liquid is applied to form a coating layer or (2) during the course of drying the coating layer formed by applying the first liquid and before the coating layer exhibits falling-drying.

The crosslinking agent is preferably added in the following manner when a boron compound is taken as an example. Specifically, when the ink-receiving layer is a layer formed by applying the coating liquid (first liquid) containing the fine particles and the water-soluble resin containing a polyvinyl alcohol to form a coating layer, which is then crosslinked and cured, the crosslinking and curing are carried out by applying the basic liquid (second liquid) having a pH of 7.1 or more to the above coating layer (1) at the same time when the above first liquid is applied to form a coating layer or (2) during the course of drying the coating layer formed by applying the first liquid and before the coating layer exhibits falling-drying. The boron compound as the crosslinking agent may be contained in either the first liquid or the second liquid, or may be contained in both the first and second liquids.

The amount of the crosslinking agent to be used is preferably 1% to 50 mass %, and more preferably 5% to 40 mass % based on the water-soluble resin.

Mordant

The second ink-receiving layer preferably contains a mordant to further improve the water resistance of a formed image and a resistance to bleeding over time. Examples of the mordant include organic mordants such as cationic polymers (cationic mordants) and inorganic mordants such as water-soluble metal compounds. Among the mordants, organic mordants are preferable, and cationic mordants are particularly preferable.

When the mordant is present in at least the upper layer part of the ink-receiving layer, the mordant may interact with a liquid ink containing an anionic dye as a colorant to stabilize the colorant, whereby the water resistance and the bleeding over time can be further improved.

In this case, the mordant is preferably used by adding it in the second liquid which is different from a liquid containing the inorganic fine particles (particularly, vapor phase method silica), while it may be added in either or both of the second ink-receiving layer coating liquid (first liquid) and/or the basic liquid (second liquid). Specifically, if the mordant is added directly to the ink-receiving layer coating liquid, there is the case where aggregation occurs under the coexistence of vapor phase method silica having an anionic charge. On the other hand, when a method in which the solution containing the mordant and the ink-receiving layer coating liquid are respectively prepared and are respectively applied is adopted, it may be unnecessary to take the aggregation of the inorganic fine particles into account and therefore the range of the selection of the mordant may become wider.

While a polymer mordant having a primary to tertiary amino group or a quaternary ammonium salt group as a cationic functional group is preferably used as the cationic mordant, a cationic non-polymer mordant may also be used.

Examples of the polymer mordant include a homopolymer of a mordant monomer (namely, a monomer having a primary to tertiary amino group or its salt or a monomer having a quaternary ammonium salt group) or a copolymer or condensed polymer of the mordant monomer and other monomers (hereinafter referred to as "non-mordant monomer"). These polymer mordants may be used in any form of a water-soluble polymer or water-soluble latex particles.

Examples of the mordant monomer include trimethyl-p-vinylbenzyl ammonium chloride, trimethyl-m-vinylbenzyl ammonium chloride, triethyl-p-vinylbenzyl ammonium chloride, triethyl-m-vinylbenzyl ammonium chloride, N,N-dimethyl-N-ethyl-N-p-vinylbenzyl ammonium chloride, N,N-diethyl-N-methyl-N-p-vinylbenzyl ammonium chloride, N,N-dimethyl-N-n-propyl-N-p-vinylbenzyl ammonium chloride, N,N-dimethyl-N-n-octyl-N-p-vinylbenzyl ammonium chloride, N,N-dimethyl-N-benzyl-N-p-vinylbenzyl ammonium chloride, N,N-diethyl-N-benzyl-N-p-vinylbenzyl ammonium chloride, N,N-dimethyl-N-(4-methyl)benzyl-N-p-vinylbenzyl ammonium chloride, N,N-dimethyl-N-phenyl-N-p-vinylbenzyl ammonium chloride;

trimethyl-p-vinylbenzyl ammonium bromide, trimethyl-m-vinylbenzyl ammonium bromide, trimethyl-p-vinylbenzyl ammonium sulfonate, trimethyl-m-vinylbenzyl ammonium sulfonate, trimethyl-p-vinylbenzyl ammonium acetate, trimethyl-m-vinylbenzyl ammonium acetate, N,N,N-triethyl-N-2-(4-vinylphenyl)ethyl ammonium chloride, N,N,N-triethyl-N-2-(3-vinylphenyl)ethyl ammonium chloride, N,N-diethyl-N-methyl-N-2-(4-vinylphenyl)ethyl ammonium chloride, N,N-diethyl-N-methyl-N-2-(4-vinylphenyl)ethyl ammonium acetate;

quaternary products of methyl chloride, ethyl chloride, methyl bromide, ethyl bromide, methyl iodide or ethyl iodide, or sulfonates, alkylsulfonates, acetates or alkylcarboxylates obtained by substituting each anion of these quaternary products of N,N-dimethylaminoethyl(meth)acrylate, N,N-diethylaminoethyl(meth)acrylate, N,N-dimethylaminopropyl(meth)acrylate, N,N-diethylaminopropyl(meth)acrylate, N,N-dimethylaminoethyl(meth)acrylamide, N,N-diethylaminoethyl(meth)acrylamide, N,N-dimethylaminopropyl(meth)acrylamide or N,N-diethylaminopropyl(meth)acrylamide.

Specific examples thereof include monomethyldiallyl ammonium chloride, trimethyl-2-(methacryloyloxy)ethyl ammonium chloride, triethyl-2-(methacryloyloxy)ethyl ammonium chloride, trimethyl-2-(acryloyloxy)ethyl ammonium chloride, triethyl-2-(acryloyloxy)ethyl ammonium chloride, trimethyl-3-(methacryloyloxy)propyl ammonium chloride, triethyl-3-(methacryloyloxy)propyl ammonium chloride, trimethyl-2-(methacryloylamino)ethyl ammonium chloride, triethyl-2-(methacryloylamino)ethyl ammonium chloride, trimethyl-2-(acryloylamino)ethyl ammonium chloride, triethyl-2-(acryloylamono)ethyl ammonium chloride, trimethyl-3-(methacryloylamino)propyl ammonium chloride, triethyl-3-(methacryloylamino)propyl ammonium chloride, trimethyl-3-(acryloylamino)propyl ammonium chloride, triethyl-3-(acryloylamino)propyl ammonium chloride;

N,N-dimethyl-N-ethyl-2-(methacryloyloxy)ethyl ammonium chloride, N,N-diethyl-N-methyl-2-(methacyloyloxy)ethyl ammonium chloride, N,N-dimethyl-N-ethyl-3-(acryloylamino)propyl ammonium chloride, trimethyl-2-(methacryloyloxy)ethyl ammonium bromide, trimethyl-3-(acryloylamino)propyl ammonium bromide, trimethyl-2-(methacryloyloxy)ethyl ammonium sulfonate and trimethyl-3-(acryloylamino)propyl ammonium acetate.

Examples of copolymerizable monomers other than the above monomers include N-vinylimidazole and N-vinyl-2-methylimidazole.

Allylamine, diallylamine and their modified compounds or salts may be also used as the mordant monomer in the invention. Examples of such a compound include an allylamine, allylamine hydrochloride, allylamine acetate, allylamine sulfate, diallylamine, diallylamine hydrochloride, diallylamine acetate, diallylamine sulfate, diallylmethylamine and its salts (such as hydrochlorides, acetates or sulfates as the salts), diallylethylamine and its salts (such as hydrochlorides, acetates or sulfates as the salts) and diallyldimethylammonium salts (such as chlorides, or acetic acid ion or sulfuric acid ion as the counter anion of these salts). Since the allylamines-modified compounds and the diallylamine-modified compounds are inferior in polymerizing ability in the form of an amine, these amine or modified compounds are usually converted into salts, which are then polymerized, and the polymerized products are desalted as required.

A vinylamine unit obtained by polymerzing a polymer unit such as N-vinylacetamide or N-vinylformamide and hydrolyzing the resulted polymer or a salt thereof may also be utilized.

The non-mordant monomer means a monomer that does not contain a primary to tertiary amino group and its salt or a basic or cationic part such as a quaternary ammonium salt group and has substantially no or substantially small interaction with dyes in inkjet ink.

Specific examples of the non-mordant monomer include alkyl(meth)acrylates; cycloalkyl(meth)acrylates such as cyclohexyl(meth)acrylate; aryl(meth)acrylates such as phenyl(meth)acrylate; aralkyl esters such as benzyl(meth)acrylate; aromatic vinyls such as styrene, vinyltoluene and α-methylstyrene; vinyl esters such as vinyl acetate, vinyl propionate and vinyl versatic acid esters; allyl ester such as allyl acetate; halogen-containing monomers such as vinylidene chloride, vinyl chloride; vinylcyanates such as (meth)acrylonitrile; and olefins such as ethylene and propylene.

The alkyl(meth)acrylate is preferably alkyl(meth)acrylates provided with an alkyl part having 1 to 18 carbon atoms. Examples of the alkyl(meth)acrylates include methyl(meth)acrylate, ethyl(meth)acrylate, propyl(meth)acrylate, isopropyl(meth)acrylate, n-butyl(meth)acrylate, isobutyl(meth)acrylate, t-butyl(meth)acrylate, hexyl(meth)acrylate, octyl(meth)acrylate, 2-ethylhexyl(meth)acrylate, lauryl(meth)acrylate and stearyl(meth)acrylate. Among these compounds, methyl acrylate, ethyl acrylate, methyl methacrylate, ethyl methacrylate and hydroxyethyl methacrylate are preferable. The non-mordant monomers may be used either singly or in combinations of two or more.

Moreover, preferable examples of the cationic mordant include polydiallyldimethyl ammonium chloride, polymethacryloyloxyethyl-β-hydroxyethyldimethyl ammonium chloride, polyethyleneimine, polyallylamine and its modified compounds, polyamide-polyamine resins, cationic starch, dicyandiamide-formalin condensate, diemthyl-2-hydroxypropylammonium salt polymers, polyamidine, polyvinylamine, dicyan cationic resins represented by a dicyandiamide-formalin polymerization condensate, polyamine cationic resins represented by a dicyanamide-diethylenetriamine polymerization condensate, epichlorohydrin-dimethylamine-addition polymers, dimethyldiallylammonium chloride-$SO_2$ copolymers, diallylamine salt-$SO_2$ copolymers, (meth)acrylate-containing polymers having a quaternary ammonium salt group substituted alkyl group at the ester part and styryl polymers having a quaternary ammonium salt group substituted alkyl group.

Examples of the cationic mordant include those described in each publication of JP-A Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134 and 1-161236, those described in each specification of U.S. Pat. Nos. 2,484,430, 2,548,564, 3,148,061, 3,309,690, 4,115,124, 4,124,386, 4,193,800, 4,273,853, 4,282,305 and 4,450,224, those described in each publication of JP-A Nos. 1-161236, 10-81064, 10-119423, 10-157277, 10-217601, 11-348409, 2001-138621, 2000-43401, 2000-211235, 2000-309157, 2001-96897, 2001-138627, 11-91242, 8-2087, 8-2090, 8-2091, 8-2093, 8-174992, 11-192777 and 2001-301314, JP-B Nos. 5-35162, 5-35163, 5-35164, 5-88846, 7-118333 and 2000-344990 and those described in each specification of JP Nos. 2648847 and 2661677. Among these cationic mordants, polyallylamine and its modified compounds are preferable and a diallyldialkyl cationic polymer is structurally preferable.

Various known allylamine polymers and their modified compounds may be used as the polyallylamine or its modified compounds. Examples of these modified compounds include salts of polyallylamine and acids (the acids are, for example, inorganic acids such as hydrochloric acid, sulfuric acid, phosphoric acid or nitric acid and organic acids such as methanesulfonic acid, toluenesulfonic acid, acetic acid, propionic acid, cinnamic acid or (meth)acrylic acid) or combinations of these salts and those which are salts of only a part of polyallylamine and acids, modified compounds obtained by a high-molecular reaction of polyallylamine and copolymers of polyallylamine and other copolymerizable monomers (specific examples of the other monomers include (meth)acrylates, styrenes, (meth)acrylamides, acrylonitrile and vinyl esters).

Specific examples of the polyallylamine and its modified compounds include those described in each publication of JP-B Nos. 62-31722, 2-14364, 63-43402, 63-43403, 63-45721, 63-29881, 1-26362, 2-56365, 2-57084, 4-41686, 6-2780, 6-45649, 6-15592 and 4-68622, JP Nos. 3199227 and 3008369, JP-A Nos. 10-330427, 11-21321, 2000-281728, 2001-106736, 62-256801, 7-173286, 7-213897, 9-235318, 9-302026 and 11-21321, WO99/21901, WO99/19372, JP-A No. 5-140213 and Japanese Patent Application National Publication (Laid-Open) No. 11-506488.

Among the cationic mordants, a diallyldialkyl cationic polymer is preferable and particularly, diallyldimethyl cationic polymer is preferable. Also, the cationic mordant is preferably a cationic polymer having a weight average molecular weight of 60,000 or less, and particularly 40,000 or less from the viewpoint of dispersibility and, particularly prevention of thickening.

The cationic mordant is also useful as the dispersant of the fine particles. When the mordant is added to the ink-receiving layer coating liquid, the concentration of sulfuric acid ions in the coating liquid is preferably 1.5 mass % in view of preventing the solution to be thickened. These sulfuric acid ions can be contained in an initiator or the like used in the production of the cationic polymer and is left in the polymer. It is therefore preferable to use a cationic mordant produced by using, for example, an initiator releasing no sulfuric acid ion.

Examples of the inorganic mordant include polyvalent water-soluble metal salts and hydrophobic metal salt compounds. Specific examples of the inorganic mordant include salts or complexes of metals selected from magnesium, aluminum, calcium, scandium, titanium, vanadium, manganese, iron, nickel, copper, zinc, gallium, germanium, strontium, yttrium, zirconium, molybdenum, indium, barium, lanthanum, cerium, praseodymium, neodymium, samarium, europium, gadolinium, dysprosium, erbium, ytterbium, hafnium, tungsten and bismuth.

Specific examples of the inorganic mordant include calcium acetate, calcium chloride, calcium formate, calcium sulfate, barium acetate, barium sulfate, barium phosphate, manganese chloride, manganese acetate, manganese formate dihydrate, ammonium manganese sulfate hexahydrate, cupric chloride, ammonium copper (II) chloride dihydrate, copper sulfate, cobalt chloride, cobalt thiocyanate, cobalt sulfate, nickel sulfate hexahydrate, nickel chloride hexahydrate, nickel acetate tetrahydrate, ammonium nickel sulfate hexahydrate, nickel amidosufate tetrahydrate, aluminum sulfate, aluminum alum, basic aluminum polyhydroxide, aluminum sulfite, aluminum thiosulfate, aluminum polychloride, aluminum nitrate nonahydrate, aluminum chloride hexahydrate, ferrous bromide, ferrous chloride, ferric chloride, ferrous sulfate, ferric sulfate, zinc phenolsulfonate, zinc bromide, zinc chloride, zinc nitrate hexahydrate, zinc sulfate, titanium tetrachloride, tetraisopropyl titanate, titanium acetylacetonate, titanium lactate, zirconium acetylacetonate, zirconium acetate, zirconium sulfate, ammonium zirconium carbonate, zirconium stearate, zirconium octylate, zirconium nitrate, zirconium oxychloride, zirconium hydroxychloride, chromium acetate, chromium sulfate, magnesium sulfate, magnesium chloride hexahydrate, magnesium citrate nonahydrate, sodium phosphorous tungstate, sodium tungsten citrate, 12-tungstophosphoric acid n-hydrate, 12-tungstosilicic acid 26-hydrate, molybdenum chloride, 12-molybdophosphoric acid n-hydrate, gallium nitrate, germanium nitrate, strontium nitrate, yttrium acetate, yttrium chloride, yttrium nitrate, indium nitrate, lanthanum nitrate, lanthanum chloride, lanthanum acetate, lanthanum benzoate, cerium chloride, cerium sulfate, cerium octylate, praseodymium nitrate, neodymium nitrate, samarium nitrate, europium nitrate, gadolinium nitrate, dysprosium nitrate, erbium nitrate, ytterbium nitrate, hafnium chloride and bismuth nitrate.

Among these inorganic mordants, aluminum-containing compounds, titanium-containing compounds, zirconium-containing compounds and compounds (salts or complexes) of metals of the IIIB group in the periodic chart are preferable.

The amount of the mordant to be added in the ink-receiving layer is preferably 0.01 to 5 g/m², and is more preferably 0.1 to 3 g/m².

Other Components

The ink-receiving layer or the coating liquid for forming the ink-receiving layer (ink-receiving layer coating liquid) may further contain, besides the essential components thereof, various known additives such as an ultraviolet ray absorber, antioxidant, fluorescent whitening agent, monomer, polymerization initiator, polymerization suppressor, bleeding preventive, antiseptic, viscosity stabilizer, antifoaming agent, surfactants, antistatic agent, matt agent, curling preventive or water resistive agent according to the need.

Other components may be used either singly or in combinations of two or more. These other components may be added in the form of water-soluble state, polymer dispersion, emulsion, or oil droplets or after made into a microcapsule. The amount of these other components to be added is preferably 0.01 to 10 g/m².

The surface of the inorganic fine particles may be treated with a silane coupling agent with the intention of improving the dispersibility of the inorganic fine particles. Preferable examples of the silane coupling agent include those having an organic functional group (for example, a vinyl group, amino group, epoxy group, mercapto group, chloro group, alkyl group, phenyl group or ester group) in addition to a portion working for coupling treatment.

The ink-receiving layer coating liquid preferably contains a surfactant. The surfactant herein referred includes a cationic surfactant, an anionic surfactant, a nonionic surfactant, an amphoteric surfactant, a fluorine surfactant and a silicone surfactant.

Examples of the nonionic surfactant include polyoxyalkylene alkyl ether and polyoxyalkylene alkylphenyl ethers (e.g., diethylene glycol monoethyl ether, diethylene glycol diethyl ether, polyoxyethylene lauryl ether, plyoxyethylene stearyl ether and polyoxyethylene nonylphenyl ether), oxyeyhylene/oxypropylene block copolymer, sorbitan fatty acid esters (e.g., sorbitan monolaurate, sorbitan monooleate and sorbitan trioleate), polyoxyethylenesorbitan fatty acid esters (e.g., polyoxyethylenesorbitan monolaurate, polyoxyethylenesorbitan monooleate and polyoxyethylenesorbitan trioleate), polyoxyethylenesorbitol fatty acid esters (e.g., polyoxyethylene sorbitol tetraoleate), glycerin fatty acid esters (e.g., glycerol monooleate), polyoxyethyleneglycerin fatty acid esters (e.g., polyoxyethyleneglycerin monostearate and polyoxyethyleneglycerin monooleate), polyoxyethylene fatty acid esters (polyethyleneglycol monolaurate and polyethylene glycol monooleate), polyoxyethylenealkylamine and acetylene glycols (e.g., 2,4,7,9-tetramethyl-5-decyne-4,7-diol and ethylene oxide adduct or propylene oxide adduct of the diol). Polyoxyalkylene alkyl ethers are preferable. The nonionic surfactant may be contained in the ink-receiving layer coating liquid.

Examples of the amphoteric surfactant include an amino acid surfactant, a carboxyammonium betaine surfactant, a sulfoneammonium betaine surfactant, an ammonium sulfate ester betaine surfactant and an imidazolium betaine surfactant. For example, as the amphoteric surfactant, those described in the specification of U.S. Pat. No. 3,843,368, and each publication of JP-A Nos. 59-49535, 63-236546, 5-303205, 8-262742 and 10-282619 may be preferably used. As the amphoteric surfactant, an amino acid surfactant amphoteric surfactant is preferable. Examples of the amino acid surfactant amphoteric surfactant include N-aminoacyl acid, which is obtained by modifying amino acids (for example, glycine, glutamic acid and histidic acid) and provided with a long-chain acyl group introduced thereinto and its salts as described in the publication of JP-A No. 5-303205.

Examples of the anionic surfactant include fatty acid salts (for example, sodium stearate and potassium oleate), alkyl sulfates (for example, sodium lauryl sulfate and triethanolamine lauryl sulfate), sulfonates (for example, sodium dodecylbenzenesulfonate), alkylsulfosuccinate (for example, sodium dioctylsulfosuccinate), alkyl diphenyl ether disulfonate and alkyl phosphate.

Examples of the cationic surfactant include alkylamine salts, quaternary ammonium salts, pyridinium salts and imidazolium salts.

Examples of the fluorine surfactant include compounds obtained by modifying an intermediate having a perfluoroalkyl group by using methods such as electrolytic fluorination, telomerization and oligomerization. Examples of the fluorine surfactant include a perfluoroalkyl sulfonate, perfluoroalkyl carboxylate, perfluoroalkyl ethyleneoxide adduct, perfluoroalkyltrialkyl ammonium salt, perfluoroalkyl group-containing oligomer and perfluoroalkyl phosphate.

As the silicone surfactant, silicone oil modified using an organic group is preferable. The silicone surfactant may have a structure in which the side chain, both of the terminals or one terminal of a siloxane structure is (are) modified by an organic group. Examples of the organic group-modification include amino-modification, polyether-modification, epoxy-modification, carboxyl-modification, carbinol-modification, alkyl-modification, aralkyl-modification, phenol-modification and fluorine-modification.

The total amount of the surfactant in the ink-receiving layer coating liquid is preferably 0.001% to 2.0 mass %, and more preferably 0.01% to 1.0 mass %.

The second ink-receiving layer is preferably formed by a Wet-on-Wet method, in which a coating liquid containing the fine particles and the water-soluble resin is applied to the surface of the support to form a coating layer, and a basic liquid having a pH of 7.1 or more is applied to the coating layer (1) at the same time when the coating liquid is applied to form a coating layer or (2) during the course of drying the coating layer formed by applying the coating liquid and before the coating layer exhibits falling-drying, to crosslink and cure the coating liquid. Here, the crosslinking agent capable of curing the water-soluble resin is preferably contained in at least one or both of the coating liquid and the basic liquid. The formation of the ink-receiving layer crosslinked and cured in the above manner is preferable from the viewpoint of ink absorbance and preventing cracks of the layer.

The mordant is preferably provided such that the thickness (depth) of the part in which the mordant exists from the surface of the second ink receiving layer is 10% to 60% with respect to the total thickness of the ink receiving layer. The mordant layer may be formed using an arbirtary method. Examples thereof include (1) a method in which a coating layer containing the above fine particles, water-soluble resin and crosslinking agent is formed and a mordant-containing solution is applied to the coating layer and (2) a method in which a coating liquid containing the fine particles and water-soluble resin and a mordant-containing solution are applied as a multilayer. Also, the mordant-containing solution may contain the inorganic fine particles, the water-soluble resin and the crosslinking agent.

The structure is preferable because it allows a lot of the mordant present in a certain part in the second ink receiving layer and therefore, the colorant of inkjet ink is sufficiently mordanted, whereby color density, bleeding over time, gloss of a printing part, and the water resistance and ozone resistance of characters and an image obtained after printing are improved. A part of the mordant may be contained in a layer formed first on the support. In this case, the remainder mordant to be added later may be the same as or different from the first blended mordant.

In the invention, the second ink-receiving layer coating liquid (first liquid) containing the fine particles (for example, vapor phase method silica) and the water-soluble resin (for example, polyvinyl alcohol) may be prepared in the following manner.

Specifically, fine particles such as vapor phase method silica are added together with a dispersant in water (for example, the concentration of these silica fine particles is 10% to 20 mass %), the mixture is pre-dispersed (primarily dispersion) using, for example, a homomixer, in succession, the obtained dispersion solution is dispersed (secondarily dispersion) using a dispersing machine such as ALTIMIZER (trade name, manufactured by Sugino Machine Limited) by one pass, and then, an aqueous polyvinyl alcohol (PVA) solution is added to the solution (for example, such that the amount of PVA is about ⅓ the mass of the vapor phase method silica), whereby the ink-receiving layer coating liquid can be prepared. It is preferable to adjust the coating liquid to pH about 9.2 by using aqueous ammonia or the like or to use a dispersant to impart stability to the solution. The resulting coating liquid has a uniform sol state. A porous ink-receiving layer having a three-dimensional network structure can be obtained by applying this coating liquid to the support by the following coating method followed by drying.

Conventionally known various dispersing machines such as a colloid mill dispersing machine, high-speed dispersing machine, medium stirring type dispersing machine (for example, a ball mill and sand mill), ultrasonic dispersing machine and high-pressure dispersing machine may be used as the dispersing machine used for the dispersion treatment. Among these dispersing machines, an ultrasonic dispersing machine and high-pressure dispersing machine (particularly, a high-pressure jet dispersing machine) are preferable from the point of efficiently dispersing pilled fine particles to be formed.

Organic solvents or mixed solvents of these solvents may be used as a solvent in each process. Examples of the organic solvent used for this coating operation include alcohols such as methanol, ethanol, n-propanol, i-propanol or methoxypropanol, ketones such as acetone or methyl ethyl ketone, tetrahydrofuran, acetonitrile, ethyl acetate and toluene.

A cationic polymer may be used as the dispersant. Examples of the cationic polymer include those given as the examples of the above mordant. Also, a silane coupling agent is preferably used as the dispersant.

The amount of the dispersant to be added is 0.1% to 30 mass % and more preferably 1% to 10 mass % based on the fine particles.

Examples of the method of applying the second solution include conventionally-known methods using an extrusion die coater, air doctor coater, blade coater, rod coater, knife coater, squeeze coater, reverse roll coater or bar coater.

At the same time when or before the ink-receiving layer coating liquid (first liquid) is applied to form a coating layer, the basic liquid (second liquid) is applied to the coating liquid. In this case, the second liquid may be applied before the coating layer exhibits falling-drying. Specifically, the ink-receiving layer is properly produced by introducing the second liquid before the coating layer exhibits constant-rate-drying after the ink-receiving layer coating liquid (first liquid) is applied. The second liquid may contain a mordant.

Here, the description "before the coating layer exhibits falling-drying" indicates a process for a few minutes just after the ink-receiving layer coating liquid is applied. During this process, the coating layer shows a "constant-rate-drying" phenomenon that the content of a solvent (dispersion medium) in the coating layer to be applied decreases in proportion to time. The time showing this "constant-rate-drying" is described in "CHEMICAL ENGINEERING HANDBOOK" (pp. 707-712, published from Maruzen, Oct. 25 (1980)).

The layer formed by applying the first liquid is dried until it exhibits the falling-drying. This drying is generally carried out at 40° C. to 180° C. for 0.5 minute to 10 minutes, and preferably at 40° C. to 100° C. for 0.5 minute to 5 minutes. The range of the time length is usually applicable while it depends on the coating amount of the first liquid.

Examples of a method of applying the second coating liquid onto the coating layer having the first solution exhibits the falling-drying include (1) a method in which the second liquid is further applied to the coating layer, (2) a method in which the second liquid is applied by using a method such as spraying and (3) a method in which a support on which the coating layer is formed is dipped in the second liquid.

Examples of the method of applying the second liquid in the method (1) include known coating methods using a curtain flow coater, extrusion die coater, air doctor coater, blade coater, rod coater, knife coater, squeeze coater, reverse roll coater or bar coater. It is preferable to utilize a method in which a coater is not brought into direct contact with the first coating layer which has been already formed, and examples thereof include a method using an extrusion die coater, curtain flow coater or bar coater.

After the second liquid is applied, the coating layer is dried and cured at 40 to 180° C. under heating for 5 to 30 minutes, the condition thereof is preferably at 40 to 150° C. for 1 to 20 minutes.

In the case where the basic liquid (second liquid) is applied at the same time when the ink-receiving layer coating liquid (first liquid) is applied, the first and second liquids are applied at the same time (multilayer coating) such that the first liquid is brought into contact with the support and then dried to cure the coating layer whereby the ink-receiving layer can be formed.

The simultaneous coating (multilayer coating) can be attained by a coating method using an extrusion die coater or curtain flow coater. After the simultaneous coating is finished, the formed coating layer is dried. In this case, the drying is usually carried out by heating the coating layer at 40° C. to 150° C. for 0.5 minute to 10 minutes and preferably at 40° C. to 100° C. for 0.5 minute to 5 minutes.

When the simultaneous coating (multilayer coating) is carried out by an extrusion coater, the two liquids are ejected at the same time to be formed into a multilayer in the vicinity of the exit port of the extrusion die coater (namely, before these liquids are transferred to the support) and applied to the support in that state. The two layer coating liquids formed into a multilayer before they are applied tend to cause a crosslinking reaction at the interface therebetween before being transferred to the support. Therefore, the two layer coating liquids to be ejected tend to be mixed with each other to increase the viscosity at around the exit port of the extrusion die coater, which may cause hindrance in the coating operation. Therefore, when these two liquids are applied simultaneously as mentioned above, a barrier layer liquid (intermediate layer liquid) can be interposed between the first and second liquids to apply these three layers simultaneously.

Any barrier layer liquid may be selected as the barrier layer liquid without any particular limitation. Examples of the barrier layer liquid include water and an aqueous liquid containing a trace amount of a water-soluble resin. The water-soluble resin is used in consideration of coatability for the purpose of thickening. Examples of the water-soluble resin include polymers such as cellulose resin (e.g., hydroxypropylmethyl cellulose, methyl cellulose and hydroxyethylmethyl cellulose), polyvinyl pyrrolidone and gelatin. The barrier layer coating liquid may contain the mordant.

Support

A support which configures the inkjet recording medium in the invention may be appropriately selected from supports on which the ink receiving layer can be arranged, such as a thermoplastic film, a resin-coated paper, a coated paper, glass, an aluminum foil, a vapor-deposited paper, a vapor-deposited film or a cloth, depending on the object and the like.

Examples of the thermoplastic film include polyester, polypropylene, polyamide, polyvinyl chloride, polystyrene, polymethyl methacrylate, cellulose acetate, polyethylene, and polycarbonate.

The support may be provided with an anchor layer for purposes such as improving adhesiveness between the ink receiving layer and the support. The anchor layer may contain a hydrophobic binder such as gelatin, a solvent-soluble binder such as polyvinyl butyral, and latex, a hardener, a pigment and/or a surfactant, which may be suitably used in combination.

The support in the invention may be applied with various kinds of back coat layers for antistatic property, transportation, anti-curling, writability, and pasting. The back coat layer may contain an inorganic antistatic agent, an organic antistatic agent, a hydrophilic binder, latex, a hardener, a pigment, a lubricant and/or a surfactant, which may be suitably used in combination.

The invention may be applied to a highly transparent inkjet recording medium that can be used as an OHP film. Not only a formulation of the ink receiving layer but also characteristics of the support are important in a recording material requiring transparency such as an OHP film. The light transmittance of the recording medium for use as an OHP film can be expressed in terms of haze, that is nearer human sense than by light transmittance ratio. The support is preferably a transparent support having a haze of 3.0 or less measured according to JIS-K-7105.

When the inkjet recording medium having the ink receiving layer provided on a support is used as an OHP film, the haze of this inkjet recording medium measured according to JIS-K-7105 is particularly preferably 10.0 or less.

In the inkjet recording medium used in applications requiring transparency, such as an OHP film, the thickness of the support is not particularly limited. For handling property and suitability for feeding in a printer, the thickness of the support is preferably about 50 µm to about 200 µm.

A formulation of the ink receiving layer as well as characteristics of the support are important for obtaining an inkjet recording medium having photographic paper-like glossiness and texture. For attaining photographic paper-like glossiness and texture, a polyester film or a resin-coated paper is preferably used, and the Hunter whiteness of the support as determined in accordance with JIS-P-8123 is particularly preferably 65% or more, and the 60° mirror gloss of the support at the side of the ink receiving layer, as determined in accordance with JIS-Z-8741, is preferably 30% or more.

Examples of the method of enhancing the whiteness of a polyester film include a method that involves allowing inorganic fine particles of barium sulfate, titanium dioxide, calcium carbonate, silicon dioxide, aluminum oxide, kaolin, talc or the like to be contained in a polyester film and a method that involves applying a white coating on the surface of a polyester film.

For conferring cushioning property and opacifying property, a void-containing film that is a film containing a large number of voids therein, such as a foamed polyester film, may also be used as the support.

When a polyester film is used as the support, the thickness thereof is not particularly limited. In view of preferable handling property and suitability for feeding in a printer, the thickness of the support is preferably about 10 µm to about 200 µm.

When a resin-coated paper is used as the support, the thickness thereof is not particularly limited either. In view of preferable handling property and suitability for feeding in a printer, the thickness of the support is preferably about 50 µm to about 300 µm. For attaining photographic paper-like glossiness and texture, the thickness is preferably about 200 µm to about 300 µm.

Abase paper for the resin-coated paper is not particularly limited, and a generally-used paper may be used. For example, a smooth base paper used in a photographic support can be preferably used.

A natural pulp, a regenerated pulp, a synthetic pump or the like may be used singly or as a mixture of two or more thereof as a pulp forming the base paper. Generally, the base paper may be compounded with additives used in paper manufacturing, such as a sizing agent, a paper strength enhancer, a filler, an antistatic agent, a fluorescent whitening agent or a dye. A surface sizing agent, a surface paper strength enhancer, a fluorescent whitening agent, an antistatic agent, a dye, anchoring agent or the like may be coated on a surface of the base paper.

The base paper is preferably a paper having high surface smoothness by being compressed by pressurization with a calender or the like during or after paper making. It is particularly preferably a paper having a Bekk smoothness of 200 seconds or more as determined in accordance with JIS-P-8119. The basis weight of the base paper is preferably in the range of 30 g/m² to 250 g/m².

When the Hunter whiteness of the base paper as determined in accordance with JIS-P-8123 is 65% or more, the whiteness of the base paper can be high to provide a recording material with classy sense, while the desired whiteness may vary depending on the object. A brownish-red base paper in which non-bleached pulp is additionally contained as natural pulp may also be used. A base paper colored with a coloring agent such as a dye may also be used.

A coating resin for the resin-coated paper is preferably a polyolefin resin, particularly preferably a polyethylene resin. For example, low-density polyethylene, medium-density polyethylene, high-density polyethylene, or a mixture thereof may be used. Herein, the "low-density polyethylene" is polyethylene having a density of 0.915 g/cm³ to 0.930 g/cm³, and is usually produced by a high-pressure process. On the other hand, the "high-density polyethylene" is polyethylene having a density of 0.950 g/cm³ or more, and is usually produced by a low- or medium-pressure process.

These polyethylene resins may be used singly or as a mixture of two or more of those having different densities and melt flow rates.

The resin-coated paper used as a water-resistant support can be produced by an extrusion-coating method in which a thermally molten polyolefin resin is cast on a traveling base paper. For improving adhesiveness between the resin and the base paper, the base paper is preferably subjected to an activation treatment such as corona discharge treatment or flame treatment before being coated with the resin. The upper surface, namely a surface of the support to which the ink receiving layer is to be provided, may be glossy, matt or the like, depending on intended application of the recording medium formed of the support. The surface is generally particularly preferably a glossy surface. It is not always necessary that a surface at the opposite side of the surface (reverse surface) is coated with a resin, while it is preferable that the reverse surface is coated with a resin in order to prevent curling. While the reverse surface is usually a matt surface, the upper surface alone or both the upper and reverse surfaces may be subjected to activation treatment such as corona discharge treatment or flame treatment if necessary.

The configuration of the resin layer in the resin-coated paper may be either that formed of a single layer or that formed of multiple layers such as two or more layers. In this case, the polyolefin resins may also be used singly or as a mixture of two or more thereof The multiple layers may have formulations that are the same or different from each other. To form the resin layer formed of multiple layers, either a co-extrusion coating method or a sequential coating method may be used.

The resin layer in the resin-coated paper may also be formed by coating with latex having film formability. For example, the resin-coated paper may be formed by coating a base paper for resin-coated paper with a latex of low MFT (minimum film-formation temperature) and then heating it to a temperature higher than the minimum film-formation temperature.

The thickness of the resin coating layer in the resin-coated paper is not particularly limited and is generally preferably 5 μm to 50 μm. The upper surface only or both the upper and reverse surfaces of the base paper is coated with the resin such that the thickness of the resin-coated paper becomes to be within the above range.

A white pigment such as titanium oxide, zinc oxide, talc or calcium carbonate, fatty acid amides such as stearic acid amide or arachic acid amide, fatty metal salts such as zinc stearate, calcium stearate, aluminum stearate or magnesium stearate, antioxidants such as 2,6-di-t-butyl-p-cresol or triphenyl phosphite, blue pigments and dyes such as cobalt blue, ultramarine blue, caecilian blue or phthalocyanine blue, magenta pigments and dyes such as cobalt violet, fast violet or manganese violet, and/or various additives such as a fluorescent whitening agent or an ultraviolet absorber may be appropriately combined and added to the resin of the resin-coated paper.

The inkjet recording method of the invention includes: using an ink containing 8 mass % or more of a water-soluble solvent having an SP value of 24 $(MPa)^{1/2}$ or less measured by the Hoy method; and using an inkjet recording medium having an outermost surface layer comprising an organic fine particle having an SP value of 25 $(MPa)^{1/2}$ or less measured by the Hoy method.

In a preferable embodiment of the invention, the inkjet recording method includes: using an ink containing 8 mass % to 50 mass % of a water-soluble solvent having an SP value of 20 $(MPa)^{1/2}$ to 24 $(MPa)^{1/2}$ measured by the Hoy method; and using an inkjet recording medium having an outermost surface layer comprising, per square meter of the outermost surface layer, 0.2 g to 5.0 g of an organic fine particle having an SP value of 17 $(MPa)^{1/2}$ to 25 $(MPa)^{1/2}$ measured by the Hoy method.

In a more preferable embodiment of the invention, the inkjet recording method includes: using an ink containing 12 mass % to 30 mass % of a water-soluble solvent having an SP value of 20 $(MPa)^{1/2}$ to 22 $(MPa)^{1/2}$ measured by the Hoy method; and using an inkjet recording medium having an outermost surface layer comprising, per square meter of the outermost surface layer, 0.2 g to 5.0 g of an organic fine particle having an SP value of 17 $(MPa)^{1/2}$ to 25 $(MPa)^{1/2}$ measured by the Hoy method.

By using the above combinations of the ink and the inkjet recording medium, bronzing can be even more effectively suppressed.

Inkjet System

The method of applying ink by an inkjet system, which can be used in the inkjet recording method of the invention, is not particularly limited, and a known inkjet system may be used. Specific examples thereof include: a method of intermittently discharging ink stored in a nozzle head portion by an electric signal converted from a mechanical signal by an electrostrictive element; and a method of intermittently discharging ink stored in a nozzle head portion by rapidly heating a part at a portion very close to a discharging portion to generate bubbles and performing intermittent discharging by volume expansion of the bubbles.

EXAMPLES

The present invention will be explained in more detail by way of examples, which are not intended to be limiting of the invention. The "parts" and "%" are on mass basis unless otherwise noted.

Preparation of Ink

A reaction container equipped with a stirrer, a thermometer, a reflux tube and a dropping funnel was flushed with nitrogen, charged with 65 parts of p-cumyl phenoxy ethyleneglycol acrylate, 10 parts of benzyl acrylate, 2 parts of acrylic acid, and 0.3 part of t-dodecyl mercaptan, and heated to 70° C. 150 parts of p-cumyl phenoxy ethyleneglycol acrylate, 15 parts of acrylic acid, 5 parts of butyl acrylate, 1 part of t-dodecyl mercaptan, 20 parts of methyl ethyl ketone and 1 part of sodium persulfate were further introduced into the dropping funnel and added dropwise to the reaction container over 4 hours, thereby polymerizing a dispersion polymer. Then, methyl ethyl ketone was added to the reaction container to prepare a solution of the dispersion polymer having a concentration of 40%. An aliquot of this polymer taken out of the solution was dried and measured for its glass transition temperature with a differential scanning calorimeter (trade name: EXSTAR6000 DSC, manufactured by Seiko Instruments Inc.) to find out that the glass transition temperature was 40° C.

40 parts of the dispersion polymer solution, 30 parts of Pigment Blue 15:1 (trichloro copper phthalocyanine pigment, trade name: G500, manufactured by Sanyo Chemical Industries, Ltd.) as a pigment, 100 parts of 0.1 mol/L aqueous sodium hydroxide, and 30 parts of methyl ethyl ketone were mixed. Thereafter, the resulted mixture was dispersed with 15 passes at 200 MPa by an ultrahigh pressure homogenizer (trade name: ULTIMIZER HJP-25005, manufactured by Sugino Machine Co., Ltd.). Thereafter, the thus-resulted dispersion was transferred to another container and 300 parts of deionized water were added thereto, followed by stirring for 1 hour. Then, the whole amount of the methyl ethyl ketone and a part of the water were distilled away from the dispersion with a rotary evaporator. The pH of the resulted dispersion was adjusted to 9 by neutralization with 0.1 mol/L sodium hydroxide. Thereafter, the dispersion was filtered through a membrane filter with a pore diameter of 0.3 μm followed by regulating its pigment concentration with deionized water to prepare a cyan pigment dispersion with a pigment concentration of 15%.

The components below were mixed with deionized water such that the content of the cyan pigment dispersion obtained above became 25%, the content of NEWPOLE 50HB55 (manufactured by Sanyo Chemical Industries, Ltd.), which was used as a solvent having an SP value of 24 $(MPa)^{1/2}$ or less (hereinafter referred to sometimes as a "specific solvent"), became 15 mass %, the content of DEG (diethylene glycol) became 10%, and the content of OLEFIN EL 010 (acetylene glycol surfactant manufactured by Nisshin Chemical Industry Co., Ltd.) became 1% to prepare an ink 1.

Inks 2 to 9 were prepared in the same manner as for ink 1, except that the components to be mixed were changed to have the formulations expressed in terms of mass ratio in Table 1 respectively.

TABLE 1

|  |  | Ink 1 | Ink 2 | Ink 3 | Ink 4 | Ink 5 | Ink 6 | Ink 7 | Ink 8 | Ink 9 |
|---|---|---|---|---|---|---|---|---|---|---|
|  | Cyan pigment dispersion | 25 | 25 | 25 | 25 | 25 | 25 | 25 | 25 | 25 |
| Specific solvent | NEWPOLE 50HB55 (SP value: 21.1) | 15 | 10 | — | — | — | — | — | — | — |
|  | 2-butyl-2-ethyl-1,3-butanediol (SP value: 23.1) | — | — | 15 | 10 | — | — | — | — | — |
|  | NEWPOLE GEP2800 (SP value: 20.7) | — | — | — | — | 15 | 5 | — | — | — |
| 1,2-Hexanediol (SP value: 24.9) | | — | — | — | — | — | — | 15 | — | — |
| 1,3-Butanediol (SP value: 27.3) | | — | — | — | — | — | — | — | 15 | — |
| Glycerin (SP value: 35.5) | | — | — | — | — | — | — | — | — | 15 |
| Diethylene glycol (SP value: 29.6) | | 10 | 15 | 10 | 15 | 10 | 20 | 10 | 10 | 10 |
| OLEFIN E1010 | | 1 | 1 | 1 | 1 | 1 | 1 | 1 | 1 | 1 |
| Deionized water | | 49 | 49 | 49 | 49 | 49 | 49 | 49 | 49 | 49 |

Preparation of Inkjet Recording Medium 1

Preparation of Support

A 1:1 mixture of broadleaf bleached kraft pulp (LBKP) and a broadleaf bleached sulfite pulp (LBSP) was beaten to have a freeness of 300 ml in terms of Canadian Standard Freeness (C.S.F.) to prepare pulp slurry. A sizing agent and an alkyl ketene dimer with an amount of 0.5% based on the pulp respectively, polyacrylamide, which works as a reinforcing agent, with an amount of 1% based on the pulp, cationized starch with an amount of 2% based on the pulp, and a polyamide epichlorohydrin resin with an amount of 0.5% based on the pulp were added to the slurry, and the resulted mixture was diluted with water to prepare a slurry having the beaten pulp concentration of 1%. This slurry was subjected to a fourdrinier paper machine to form paper having a basis weight of 170 g/m$^2$, followed by drying and humidity conditioning, to produce a base paper for forming a support. A polyethylene resin composition, which is formed by uniformly dispersing, to a 100 mass % of a low-density polyethylene having a density of 0.918 g/cm$^3$, 10 mass % of anatase titanium, was melted at 320° C., extruded at 200 m/min to be a layer having a thickness of 30 μm provided onto a printing side of the produced base paper, and cooled on a minutely roughened cleaning roll, to form a resin coating layer provided at the side of the support to which an ink receiving layer is to be provided. Similarly, a resin composition prepared by blending 70 parts of a high-density polyethylene resin having a density of 0.962 g/cm$^3$ with 30 parts of a low-density polyethylene resin having a density of 0.918 g/cm$^3$ was melted at 320° C. and extruded to be a layer having a thickness of 25 μm provided onto the reverse surface of the support under cooling with a cleaning roll, to form a resin coating layer thereon.

The side of the support to be provided with an ink receiving layer was subjected to high-frequency corona discharge treatment, and then coated with an undercoat layer having the following formulation so that the coating amount of gelatin per square meter became 50 mg/m$^2$, followed by drying to form an undercoat layer thereon. The term "parts" below refers to parts by mass of solid content or substantial component.

Formulation of Undercoat Layer

| Lime-treated gelatin | 100 parts |
|---|---|
| 2-Ethylhexyl sulfosuccinate | 2 parts |
| Chrome alum | 10 parts |

The support was coated with a second ink receiving layer-forming coating liquid with the following formulation in a dry solid content of 25 g/m$^2$ by a slide beads coater, cooled at 5° C. for 30 seconds and then dried at 45° C. under 10% RH until the total solid content of the formed coating layer reached 80%, followed by coating the resultant with a first ink receiving layer-forming coating solution with the following formulation in a dry solid content of 0.8 g/m$^2$ by a gravure coater and drying it at 50° C., to obtain an inkjet recording medium 1.

Formulation of Second Ink Receiving Layer-Forming Coating Liquid

| Vapor phase silica (trade name: AEROSIL 300SF75, manufactured by Nippon Aerogel Co., Ltd.) | 100 parts |
|---|---|
| Dimethyl diallyl ammonium chloride homopolymer (trade name: SHAROL DC902P, manufactured by Dai-ichi Kogyo Seiyaku Co., Ltd., molecular weight: 9000) | 3 parts |
| Boric acid | 5 parts |
| Polyvinyl alcohol (degree of saponification: 88%, average polymerization degree: 3500) | 23 parts |

Formulation of First Ink Receiving Layer-Forming Coating Liquid

| MOWINYL 630 (trade name, manufactured by Nichigo-Mowinyl, vinyl acetate-acrylic emulsion, SP value: about 20) | 100 parts |
|---|---|

Preparation of Inkjet Recording Medium 2

An inkjet recording medium 2 was prepared in the same manner as the inkjet recording medium 1, except that BONCOAT CG-5030 (trade name, manufactured by Dainippon Ink And Chemicals, Incorporated, vinyl acryl-urethane emulsion, SP value: about 22) was used in place of the MOWINYL 630 (described above).

Preparation of Inkjet Recording Medium 3

An inkjet recording medium 3 was prepared in the same manner as the inkjet recording medium 1, except that MOWINYL 180E (trade name, manufactured by Nichigo-Mowinyl, vinyl acetate-acrylic emulsion, SP value: about 18) was used in place of the MOWINYL 630 (described above).

Preparation of Inkjet Recording Medium 4

An inkjet recording medium 4 was prepared in the same manner as the inkjet recording medium 1, except that MOWINYL 880 (trade name, manufactured by Nichigo-Mowinyl, styrene-acrylic emulsion, SP value: about 20) was used in place of the MOWINYL 630 (described above).

Preparation of Inkjet Recording Medium 5

An inkjet recording medium 5 was prepared in the same manner as the inkjet recording medium 1, except that BONCOAT 5391 (trade name, manufactured by Dainippon Ink And Chemicals, Incorporated, styrene-acrylic emulsion, SP value: about 20) was used in place of the MOWINYL 630 (described above).

Preparation of Inkjet Recording Medium 6

An inkjet recording medium 6 was prepared in the same manner as the inkjet recording medium 1, except that PVA117 (trade name, manufactured by Kuraray Co., Ltd., polyvinyl alcohol, SP value: 28.9) was used in place of the MOWINYL 630 (described above).

Preparation of Inkjet Recording Medium 7

An inkjet recording medium 7 was prepared in the same manner as the inkjet recording medium 1, except that the first ink receiving layer-forming coating liquid was not applied (namely, the first ink receiving layer was not formed) therein.

Example 1

As the ink, each of inks 1 to 5 prepared above was refilled in a cartridge of an inkjet printer (trade name: PX-900G, manufactured by Seiko Epson Corporation) and used in inkjet recording with maximum ink discharge by solid printing on each of the inkjet recording mediums 1 to 5 prepared above.

Comparative Example 1

An inkjet recording of Comparative example 1 was performed in the same manner as Example 1, except that the inks 6 to 9 were used in place of the inks 1 to 5.

Comparative Example 2

An inkjet recording of Comparative example 2 was performed in the same manner as Example 1, except that the inkjet recording media 6 and 7 were used in place of the inkjet recording media 1 to 5.

Comparative Example 3

An inkjet recording of Comparative example 3 was performed in the same manner as Comparative example 1, except that the inkjet recording media 6 and 7 were used in place of the inkjet recording media 1 to 5.

Evaluation of Bronzing

Each of the inkjet recording media subjected to the inkjet recording was visually observed for its printing portion to be evaluated in terms of bronzing under the following evaluation criteria. The results are shown in Table 2.

Criteria of Evaluation of Bronzing:

5: Bronzing could not be observed.

4: Slight bronzing could be observed.

3: Bronzing could be observed but at a practically acceptable level.

2: Bronzing was observed at a practically problematic level.

1: Bronzing was clearly observed.

TABLE 2

|  | Content of Specific solvent (%) | SP value of Solvent | Inkjet recording medium 1 (SP value: about 20) | Inkjet recording medium 2 (SP value: about 22) | Inkjet recording medium 3 (SP value: about 18) | Inkjet recording medium 4 (SP value: about 20) | Inkjet recording medium 5 (SP value: about 20) | Inkjet recording medium 6 (SP value: 28.9) | Inkjet recording medium 7 (SP value:—) |
|---|---|---|---|---|---|---|---|---|---|
| Ink 1 | 15 | 21 | 5 | 5 | 5 | 5 | 5 | 1 | 1 |
| Ink 2 | 10 | 21 | 5 | 5 | 5 | 5 | 5 | 2 | 1 |
| Ink 3 | 15 | 23 | 4 | 5 | 4 | 5 | 5 | 2 | 1 |
| Ink 4 | 10 | 23 | 4 | 5 | 3 | 4 | 4 | 2 | 1 |
| Ink 5 | 15 | 21 | 5 | 5 | 5 | 5 | 5 | 1 | 1 |
| Ink 6 | 5 | 21 | 3 | 3 | 2 | 3 | 3 | 1 | 1 |
| Ink 7 | — | 25 | 2 | 3 | 1 | 2 | 2 | 3 | 1 |
| Ink 8 | — | 27 | 1 | 1 | 1 | 1 | 1 | 3 | 1 |
| Ink 9 | — | 36 | 1 | 1 | 1 | 1 | 1 | 1 | 1 |

From Table 2, it can be understood that according to the inkjet recording method, bronzing could be suppressed without heating treatment.

What is claimed is:

1. An inkjet recording method comprising applying, by an inkjet system, an ink comprising 8 mass % or more of a water-soluble solvent having an SP value of 24 $(MPa)^{1/2}$ or less measured by a Hoy method onto an outermost surface layer, which contains an organic fine particle having an SP value of 25 $(MPa)^{1/2}$ or less measured by the Hoy method, of an inkjet recording medium comprising a support and one or more ink receiving layers including the outermost surface layer, wherein the molecular weight of the water-soluble solvent is 230 or more, and the water-soluble solvent is selected from the group consisting of polyoxyethylene-polyoxypropylene glycols, polyoxyethylene-polyoxypropylene-alkyl ethers and polyoxyethylenepolyoxypropylene-glyceryl ethers.

2. The inkjet recording method of claim 1, wherein the water-soluble solvent has an SP value of 22 $(MPa)^{1/2}$ or less measured by the Hoy method.

3. The inkjet recording method of claim 1, wherein the ink comprises 12 mass % or more of the water-soluble solvent having an SP value of 24 $(MPa)^{1/2}$ or less measured by the Hoy method.

4. The inkjet recording method of claim 1, wherein the ink comprises 12 mass % to 50 mass % of a water-soluble solvent having an SP value of 20 $(MPa)^{1/2}$ to 24 $(MPa)^{1/2}$ measured by the Hoy method, and the outermost surface layer comprises, per square meter of the outermost surface layer, 0.2 g to 5.0 g of an organic fine particle having an SP value of 17 $(MPa)^{1/2}$ to 25 $(MPa)^{1/2}$ measured by the Hoy method.

5. The inkjet recording method of claim 1, wherein the ink comprises 8 mass % to 30 mass % of a water-soluble solvent having an SP value of 20 $(MPa)^{1/2}$ to 22 $(MPa)^{1/2}$ measured by the Hoy method, and the outermost surface layer comprises, per square meter of the outermost surface layer, 0.2 g to 5.0 g of an organic fine particle having an SP value of 17 $(MPa)^{1/2}$ to 25 $(MPa)^{1/2}$ measured by the Hoy method.

6. The inkjet recording method of claim 1, wherein the ink comprises 12 mass % to 50 mass % of a water-soluble solvent having an SP value of 20 $(MPa)^{1/2}$ to 24 $(MPa)^{1/2}$ measured by the Hoy method, and the outermost surface layer comprises, per square meter of the outermost surface layer, 0.2 g to 5.0 g of an organic fine particle having an SP value of 19 $(MPa)^{1/2}$ to 24 $(MPa)^{1/2}$ measured by the Hoy method.

7. The inkjet recording method of claim 1, wherein the ink further comprises a pigment.

* * * * *